United States Patent
Khizar et al.

(10) Patent No.: US 11,726,000 B2
(45) Date of Patent: Aug. 15, 2023

(54) HYBRID FLUORESCENT UV DYE FOR REFRIGERANT SYSTEMS

(71) Applicant: WHIRLPOOL CORPORATION, Benton Harbor, MI (US)

(72) Inventors: Muhammad Khizar, St. Joseph, MI (US); Raymond Thompson, St. Joseph, MI (US); Jordan Sahs, St. Joseph, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 303 days.

(21) Appl. No.: 17/130,973

(22) Filed: Dec. 22, 2020

(65) Prior Publication Data

US 2022/0196510 A1 Jun. 23, 2022

(51) Int. Cl.

| | |
|---|---|
| *C09K 11/06* | (2006.01) |
| *G01M 3/22* | (2006.01) |
| *C09K 5/04* | (2006.01) |
| *F25B 49/02* | (2006.01) |
| *B82Y 30/00* | (2011.01) |
| *B82Y 40/00* | (2011.01) |

(52) U.S. Cl.
CPC ............. *G01M 3/222* (2013.01); *C09K 5/041* (2013.01); *C09K 11/06* (2013.01); *F25B 49/02* (2013.01); *B82Y 30/00* (2013.01); *B82Y 40/00* (2013.01); *F25B 2500/222* (2013.01)

(58) Field of Classification Search
CPC ........ G01M 3/222; G01M 3/22; C09K 5/041; C09K 11/06; F25B 49/02; F25B 2500/222; F25B 49/005; B82Y 30/00; B82Y 40/00
USPC ............................................. 73/40.7
See application file for complete search history.

(56) References Cited

U.S. PATENT DOCUMENTS

| | | |
|---|---|---|
| 7,943,380 B2 | 5/2011 | Westman et al. |
| 8,110,401 B2 | 2/2012 | Duerr |
| 9,260,656 B2 | 2/2016 | Aizawa et al. |
| 10,401,253 B2 * | 9/2019 | Cooper .................. G01M 3/20 |
| 2005/0145822 A1 | 7/2005 | Drigotas et al. |

FOREIGN PATENT DOCUMENTS

| | | | |
|---|---|---|---|
| JP | 5540867 B2 | 7/2014 | |
| WO | WO-2012049657 A1 * | 4/2012 | ......... A61K 49/0021 |

* cited by examiner

*Primary Examiner* — Prem C Singh
*Assistant Examiner* — Francis C Campanell
(74) *Attorney, Agent, or Firm* — Brooks Kushman P.C.

(57) ABSTRACT

A hybrid structure ultraviolet dye for leak detection in an appliance includes a ceramic matrix defining pores, and fluorophores encapsulated in nanoparticles bonded to the ceramic matrix within the pores. Upon excitation, the fluorophores release energy and emit fluorescent light to be detected under an ultraviolet lamp. The hybrid structure ultraviolet dye can be included in the refrigerant of a sealed system such that upon refrigerant, the hybrid structure ultraviolet dye, or both exit the sealed system at a leak onto external surfaces of the components, the color emitted by the fluorophores can be detected via application of a UV light.

19 Claims, 4 Drawing Sheets

US 11,726,000 B2

HYBRID FLUORESCENT UV DYE FOR REFRIGERANT SYSTEMS

TECHNICAL FIELD

The present application is directed to additives for refrigerants, and more particularly a nanomaterial-based fluorophore-encapsulated ultraviolet dye for detecting refrigerant leaks.

BACKGROUND

Home appliances such as refrigerators typically include a cooling system which incorporates various components (e.g., evaporators, condensers, compressors, expansion valves, etc.) to circulate a refrigerant to provide cooling. Refrigerants commonly used include azeotropic refrigerants, zeotropic refrigerants, inorganic refrigerants (e.g., carbon dioxide), and hydrocarbon refrigerants (e.g., hydrochlorofluorocarbon, hydrofluorocarbons (HFCs), or chlorofluorocarbons (CFCs)). The refrigerant piping can develop leaks of the refrigerant during the lifetime of the appliance, typically at connection joints between components in the cooling system. However, because the refrigerant is odorless and colorless, it is difficult to determine the source of or the exact location of refrigerant leaks, or even be aware of the leak. One method of locating leaks includes removing the refrigerant from the system and charging the system with nitrogen and soap bubbles to search for and identify leak locations. This method is time consuming and may be costly to perform. Other leak detection methods include using expensive electric leak detection tools, that are manufactured according to specific refrigerants, and are thus selective and not universally usable for all refrigerants.

Another method of detecting leaks is by including a dye solution additive in conventional refrigerants. Conventional refrigerants include an ultraviolet (UV) dye color solution that is florescent green. However, joint fusing techniques utilize a similar dye that is also fluorescent green to indicate the joint has been fused/the adhesive has set, which may make it difficult to identify a leak at a joint from the joint fusing compound used to fuse the joint. Conventional dye solutions further require specific UV light sources of specific intensities and spectrums to effectively identify leaks in the coolant system. Conventional solutions may also require special lenses that are worn by the technician to improve illuminance of dye materials to help identify the leaks. Furthermore, in some instances where the dye solution is added to the system, the dye may not pass through a leak, making a diagnosis of poor cooling performance difficult to confirm.

SUMMARY

According to one or more embodiments, a hybrid structure ultraviolet dye for leak detection in an appliance includes a ceramic matrix defining pores, and fluorophores encapsulated in nanoparticles bonded to the ceramic matrix within the pores. Upon excitation, the fluorophores release energy and emit fluorescent light to be detected under an ultraviolet lamp.

According to at least one embodiments, the fluorophores may exhibit red, yellow, orange, or shades therebetween. In one or more embodiments, the ceramic matrix may be a silica, a colloidal silica matrix, an alumina matrix, a titania matrix, or a zirconia matrix. In at least one embodiment, the nanoparticles may be non-covalently bonded to the ceramic matrix. In certain embodiments, the nanoparticles may include a mixture of the fluorophores and a dye pigment. In one or more embodiments, the nanoparticles may each individually have an average particle size of 1 to 10 nm. In other embodiments, the nanoparticles may be coagulated and may have an average particle size of 10 to 150 nm. In at least one embodiment, the nanoparticles may be loaded onto the ceramic matrix at 0.5% to 10% by weight.

According to one or more embodiments, a sealed system for a home appliance includes a compressor, at least one heat exchanger, and tubing connecting and between the compressor and each of the at least one heat exchanger. The sealed system further includes a refrigerant within the connecting tubing and flowing between the compressor and the at least one heat exchanger through the sealed system. The refrigerant includes a hybrid structure ultraviolet dye having nanoparticles bonded to a ceramic matrix, with the nanoparticles encapsulating fluorophores. Responsive to application of an ultraviolet light, the fluorophores emit fluorescence such that leaks can be located based on presence of the hybrid structure ultraviolet dye on external surfaces of the sealed system.

According to at least one embodiment, the refrigerant may include 0.25% to 10% by weight of the hybrid structure ultraviolet dye. In at least one embodiment, the fluorophores may exhibit red, yellow, orange, or shades therebetween. In one or more embodiments, the nanoparticles may be non-covalently bonded to the ceramic matrix. In at least one embodiment, the ceramic matrix may be a silica, a colloidal silica matrix, an alumina matrix, a titania matrix, or a zirconia matrix. In one or more embodiments, the nanoparticles may each individually have an average particle size of 1 to 10 nm. In other embodiments, the nanoparticles may be coagulated and may have an average particle size of 10 to 150 nm. In certain embodiments, the nanoparticles may include a mixture of the fluorophores and a dye pigment.

According to one or more embodiments, a method of detecting a leak in a sealed system of a home appliance includes adding a hybrid structure ultraviolet dye to a refrigerant, with the hybrid structure ultraviolet dye including fluorophores encapsulated within nanoparticles and bonded to a ceramic matrix. The method further includes circulating the refrigerant through components of the sealed system such that the refrigerant, the hybrid structure ultraviolet dye, or both exit the sealed system at a leak onto external surfaces of the components. The method also includes locating the leak by applying a UV light to the external surfaces and observing a color emitted by the fluorophores.

According to at least one embodiment, the hybrid structure ultraviolet dye may further include a dye pigment in the nanoparticles such that the observing may be viewing a dye color exhibited on the external surfaces. In one or more embodiments, the adding the hybrid structure ultraviolet dye to the refrigerant may be conducted after opening the sealed system. In certain embodiments, the color may be red, yellow, orange, or shades therebetween.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

According to one or more embodiments, a refrigerant for a coolant system for a home appliance includes a hybrid fluorescent UV dye for detecting leaks. The hybrid fluorescent UV dye includes nanoparticles encapsulating fluorophores with the encapsulated fluorophore nanoparticles being loaded onto a silica matrix via noncovalent bonding. When the fluorophore is excited (e.g., by application of a UV light) to a higher electronic state, i.e., the excited state, the fluorophore beings releasing energy to return to the relaxed ground state after an excited state lifetime. The excited state lifetime may be very short, for example 1-10 nanoseconds. After the excited state, the energy begins to decay toward the relaxed singlet ground state. During the return to the relaxed state, the fluorophore releases energy as fluorescent emission, thus exhibiting photoluminescence to be observably detected by under the UV light. The nanoparticles may also include a dye within the nanoparticle. The hybrid fluorescent UV dye allows for leaks to be detected with minimal time, effort, and equipment, and can be used in both hydrocarbon or hydrochlorofluorocarbon refrigerants.

Figure 1:
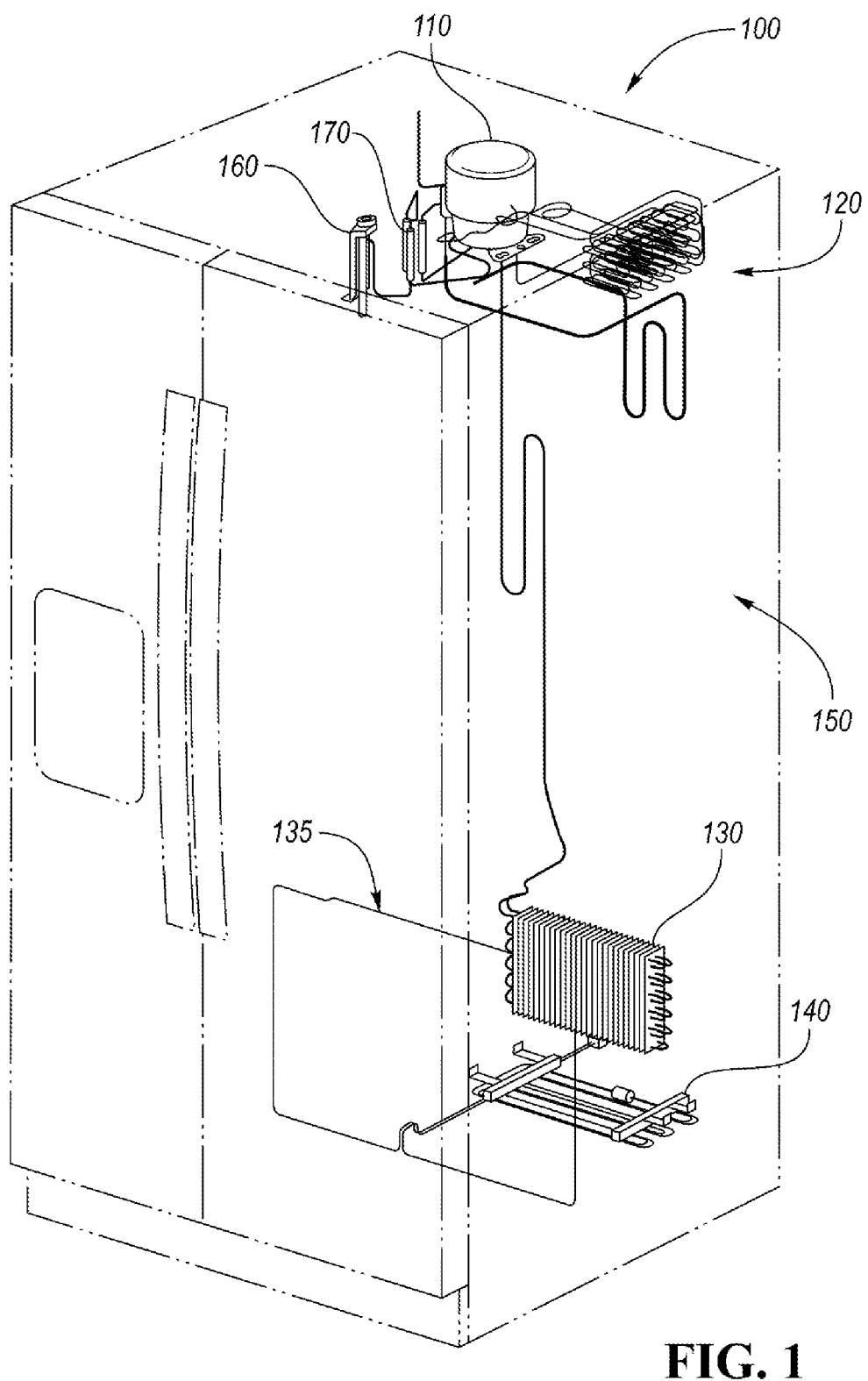
FIG. 1 is a schematic illustration of a sealed refrigerant system of a home appliance.

Referring to FIG. 1, a sealed system 100 of a home appliance is schematically shown, according to an embodiment. Although the home appliance is shown as a refrigerator, any suitable home appliance having a sealed system 100 is contemplated (e.g., water dispensers, air conditioners, freezers, washers, dryers, etc.), and reference to a refrigerator is not intended to be limiting. Other appliances such as freezers may also be contemplated. As such, the sealed system 100 may be any system requiring refrigerant and/or oil, however refrigerant will be used hereinafter to refer to the fluid within the sealed system 100. The refrigerant may be any suitable flammable or non-flammable refrigerant, such as, but not limited to, azeotropic refrigerants, zeotropic refrigerants, inorganic refrigerants (e.g., carbon dioxide), and hydrocarbon refrigerants (e.g., hydrochlorofluorocarbon, hydrofluorocarbons (HFCs), or chlorofluorocarbons (CFCs)). In certain embodiments, the refrigerant is a hydrocarbon or hydrochlorofluorocarbon refrigerant (e.g., R600a or R134a).

Referring again to FIG. 1, the sealed refrigerant system 100 includes a compressor 110, a condenser 120, and an evaporator 130. The compressor 110, the condenser 120, and the evaporator 130 may be any suitable component as known in conventional refrigerators, and form a refrigeration circuit within the refrigerator. Furthermore, additional components may be included within the sealed system 100, as are known in conventional refrigerators, for example, expansion valves, or other types of heat exchangers. In certain embodiments, as depicted in FIG. 1, the sealed system 100 may include an optional refrigerant valve 160 and filtered by an optional refrigerant filter 170. The evaporator 130 may be part of (i.e., exchange heat with) the front mullion heat loop 135 and the condensate drain pan heat loop 140, as shown in FIG. 1, which aid in evaporating condensate from the evaporator 130 and preventing moisture from frosting within the home appliance and/or on the exterior surfaces of the home appliance. The sealed system 100 includes connecting tubing 150 to fluidly connect the components of the refrigeration circuit (e.g., the compressor 110, the condenser 120, and the evaporator 130) forming the sealed system 100. The connecting tubing 150 may be made of any suitable material, including, but not limited to, copper, steel, aluminum, or combinations thereof. The connecting tubing 150 forms a flow loop for circulating the refrigerant through the components of the sealed system 100. Although the components are positioned in a particular manner, the depiction of the arrangement is not intended to be limiting, and component configurations may vary depending on the model design. Furthermore, although only a single unit of each component (i.e., compressor 110, condenser 120, evaporator 130, etc.) is depicted in FIG. 1, the home appliance may include any number of each component in the sealed system (e.g., multiple heat exchangers of various types, or additional valves, compressors, or pumps), and the depiction of this particular arrangement is not intended to be limiting.

The sealed system 100, as previously discussed, includes a refrigerant, oil, or combinations thereof. The sealed system 100 further includes a leak detection additive included in the refrigerant. Although hereinafter the discussion of the fluid within the sealed system 100 will be focused on the leak detection additive, the sealed system 100 may include any other suitable additives and components for improving the performance and efficiency of the sealed system 100, and the discussion of a particular additive is not intended to be limiting. As such, the formulation for the sealed system 100 may include any number of suitable additives. The leak detection additive is a hybrid structure ultraviolet (UV) dye for detecting leaks in the sealed system 100. The refrigerant within the sealed system includes the hybrid structure UV dye such that leaks from the components of the sealed system 100 and refrigerant circuit can be viewed under a UV light on the outside of the components (at the leak) of the sealed system 100. The hybrid structure UV dye is formed from fluorophore encapsulating nanoparticles (hereinafter fluorophore nanoparticles) loaded onto a ceramic matrix. The fluorophore nanoparticle is a fluorophore encapsulated in a nanoparticle, thus forming the fluorophore nanoparticle. In certain embodiments, the encapsulated fluorophore may further include a dye, however fluorophores by definition may emit specific colors when releasing energy when returning to the ground state after the excited state, based on the selected fluorophore. The fluorophore and/or dye may be included within the nanoparticle in certain embodiments at 0.5% to 15% loading by weight, in other embodiments 0.5% to 10% by weight, and in yet other embodiments and 0.5% to 5% by weight. The hybrid structure UV dye allows for improved dye color detection based on the inclusion of dye in the nanoparticles, and features such as, but not limited to, low permeability, smaller letdown mixing ratios of the dye additive in the refrigerant, smaller letdown temperatures, smaller dry contents density, and the like because of the nanoparticle encapsulation. The dye color detection may be conducted using selected UV lighting wavelength (e.g., a UV-A LED light of wavelength 380 nm to 330 nm may be utilized to detect the dye color depending of the type of the dye used).

The fluorophore nanoparticles may be loaded onto the ceramic matrix in any suitable amount based on a variety of factors, including, but not limited to, the operating constraints of the sealed system 100, the material properties of the refrigerant and/or oil, or the porosity of the ceramic matrix. In certain embodiments, the fluorophore nanoparticles may be 0.5% to 10% by weight of the ceramic matrix, in other embodiments, 1.0% to 7.5%, and in yet other embodiments 1.5% to 5.0%. Thus, the hybrid structure UV dye is a combination of fluorophore nanoparticles within pores of a ceramic matrix (or, in some embodiments, nanomatrix). The fluorophore nanoparticles have any suitable size individually (i.e., average particle size as based on a diameter of the particle), for example, in some embodiments, 1 to 10 nm, in other embodiments 1.5 to 7.5 nm, and in yet other embodiments 2 to 5 nm. Furthermore, the individual fluorophore nanoparticles may coagulate, and as such, the average particle size may be alternatively measured as based on a coagulated group of nanoparticles, for example, in some embodiments 10 to 150 nm, in other embodiments, 15 to 125 nm, and in yet other embodiments 20 to 100 nm.

The fluorophore nanoparticles are loaded onto the ceramic matrix by any suitable process, such as, but not limited to, blending, to form the hybrid structure UV dye. The ceramic material may be in a colloidal form to assist in the loading process. In one or more embodiments, the ceramic matrix may be a ceramic oxide, such as, but not limited to, silica, alumina, zirconia, titania, etc., colloidal ceramic oxide, or ceramic matrix composite. In certain embodiments, the ceramic matrix may be silica or a colloidal silica matrix. The fluorophore nanoparticles may be covalently or non-covalently bonded to the ceramic matrix. In certain embodiments, the fluorophore nanoparticles are non-covalently bonded to the ceramic matrix. In embodiments where the nano-additive is non-covalently bonded to the ceramic matrix, the fluorophores are encapsulated inside sol-gel colloidal silica to form the hybrid structure UV dye for addition to the refrigerant. The fluorophore nanoparticles are homogenously mixed and blended to non-covalently bond the fluorophore nanoparticles to the ceramic matrix. Covalently bonding may limit homogeneous mixing when preparing a hybrid blend of the nanoparticles and the ceramic matrix, and as such, other techniques may be utilized for loading the ceramic matrix. In one or more examples, the fluorophore nanoparticles and the ceramic matrix may be mixed with a dual asymmetric centrifuge, or other device capable of mixing high viscosity ceramic pastes (for example, capable of mixing 300 g/min).

The pores of the ceramic matrix are sized to receive one or more of the fluorophore nanoparticles or coagulated fluorophore nanoparticles, and in some embodiments, may include pores of various sizes. The ceramic matrix may be, in some embodiments, a nanomatrix such that the average pore size is on the nanoscale (e.g., 1 nm to 1000 nm). Generally, the ceramic matrix may have any suitable pore size for supporting the fluorophore nanoparticles, for example, in some embodiments 5 nm to 500 µm, in other embodiments, 10 nm to 250 µm, and in yet other embodiments, 20 nm to 100 µm. The size of the fluorophore nanoparticles and the ceramic matrix individually and in combination allow for small leaks in the sealed system 100 and leaks within low pressure areas of the sealed system 100 to be detected when compared with conventional leak detection additives having larger particle sizes. Because the dye pigment is included in nanoparticles, smaller leaks of refrigerant can be detected, because the particle size is small enough to allow the refrigerant and the nanoparticles to leak through any openings in the sealed system 10. Thus, any leaks from the having a size from the nanoscale and larger would allow the fluorophore nanoparticles to leave the sealed system 100 to the outside environment (e.g., on the component external surfaces) such that they can be detected via application of a UV light 210, as shown in FIG. 2.

In one or more embodiments, the hybrid structure UV dye is compatible with any suitable flammable or non-flammable refrigerant, such as, but not limited to, azeotropic refrigerants, zeotropic refrigerants, inorganic refrigerants (e.g., carbon dioxide), and hydrocarbon refrigerants (e.g., hydrochlorofluorocarbon, hydrofluorocarbons (HFCs), or chlorofluorocarbons (CFCs)). In certain embodiments, the refrigerant is a hydrocarbon or hydrochlorofluorocarbon refrigerant (e.g., R600a or R134a). The refrigerant may be loaded with the hybrid structure UV dye in any suitable quantity depending on the amount of refrigerant charged in the sealed system 100, the operating parameters of the refrigerant, or based on other system constraints and considerations. In certain embodiments, the refrigerant may include 0.25% to 10% by weight of the hybrid structure UV dye, in other embodiments 0.4% to 7.5%, and in yet other embodiments 0.5% to 5%. In certain embodiments, the refrigerant may include 0.5% to 3.5% by weight of the hybrid structure UV dye. The inclusion of the hybrid structure UV dye in the refrigerant results in a leak being quickly detected upon the refrigerant leaking from the system, as will be discussed below with respect to FIGS. 2-4, and via the fluorescence excitation properties of fluorophores (i.e., the ability to generate high energy photons in the form of specific color) which show a high resolution color with high sensitivity against irradiated selected light used for leak detection. In certain embodiments, the excitation sensitivity of the fluorophores may range from in some embodiments, 5,000 to 50,000 $M^{-1}cm^{-1}$, in other embodiments 10,000 to 35,000,000 $M^{-1}cm^{-1}$, and in yet other embodiments, 15,000 to 25,000,000 $M^{-1}cm^{-1}$. The fluorophore nanoparticles may have, in some embodiments, a resolution of 500 to 7,500 photons per cycle, in other embodiments, 750 to 6,500 photons per cycle, and in yet other embodiments, 1,000 to 5,000 photons per cycle.

A leak in the sealed system 100 would allow either refrigerant, oil, the hybrid structure UV dye, or combinations thereof to leave the sealed system 100 as dependent on the size of the opening for the leak. Upon excitation by the UV light (for example, a hand held torch), the fluorophore nanoparticles may exhibit in any suitable color for detecting a leak in the sealed system 100, such as, but not limited to, red, orange, or yellow, and any shades therebetween. Other colors are also contemplated as based on the fluoro-luminescence of the fluorophores upon excitation by the UV light and releasing energy to return to the ground state. As mentioned earlier, when a fluorophore is excited to a higher electronic state, it immediately wants to begin releasing energy, and thus emits fluorescence. Thus, the color exhibited by the hybrid structure UV dye is distinguishable from the colors used by adhesive agents for joint fusion in sealed system applications. Furthermore, in certain embodiments, the hybrid UV dye exhibits a leak detection color change based on the type of refrigerant. For example, the hybrid structure UV dye will be a first color, such as red, if the leak is of a flammable refrigerant (e.g., R600a), and a second color, such as yellow, if the leak is of a non-flammable refrigerant (e.g., R134a). The selected fluorophores for the dye may be based on the refrigerant used, and as such may indicate to a technician the type of refrigerant being used in the sealed system 100.

Figure 2:
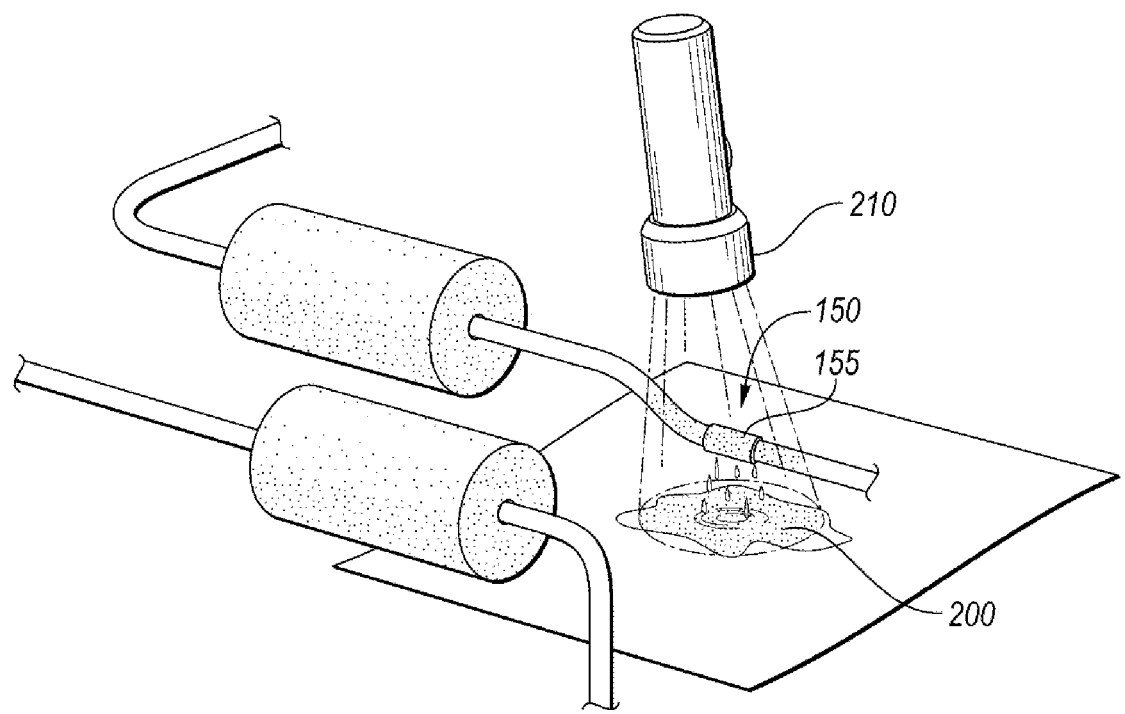
FIG. 2 is a schematic illustration of leak detection system with a hybrid structure ultraviolet dye, according to an embodiment.

As shown schematically in FIG. 2, the UV light 210 is applied (e.g., via a hand held torch) to a location with a leak, shown as a joint 155 in the connecting tubing 150 near the top portion of the condenser 120. As will be discussed with reference to FIGS. 3-4, the hybrid structure UV dye 200 may be factory installed within the sealed system 100 or added by a technician upon inspection when searching for a leak as indicated by other issues in refrigerator operation. The UV light 210 renders the hybrid structure UV dye 200 visible by exciting the fluorophore nanoparticles such that they emit light as they return to the grounded state. Although conventional dyes may similarly be detected using a UV light, the particle size of the fluorophore nanoparticles and the range of possible colors exhibited by the fluorophores, along with their compatibility with a variety of refrigerants, provides for improved leak detection and ability to differentiate leaks from adhesive at joint connections. The fluorophore nanoparticles allow for a bright color to be exhibited, without requiring aggregation-caused quenching. The hybrid structure UV dye indicates leaks quickly and early because of the small particle size and high resolution (before a large leak occurs and at locations other than joint fusions), and is sensitive against irradiated selected light (e.g., selected wavelengths for detection based on the nanoparticle composition), allowing for more accurate leak detection.

By utilizing the nanoparticle encapsulated fluorophores on the ceramic matrix, the hybrid structure UV dye exhibits improvements in photostability, color, blinking as well as particle size and surface chemistry over conventional fluorescent dyes. Furthermore, the fluorophore nanoparticles allow for stability over a range of ambient temperature within the sealed system 100, for example, in some embodiments up to 85° C. As such, the hybrid structure UV dye offers enhanced brightness via the fluorophore nanoparticles and a photostable matrix via the ceramic structure such that the hybrid structure UV dye can be added to various types of refrigerants and be easily detected when searching for leaks.

Figure 3:
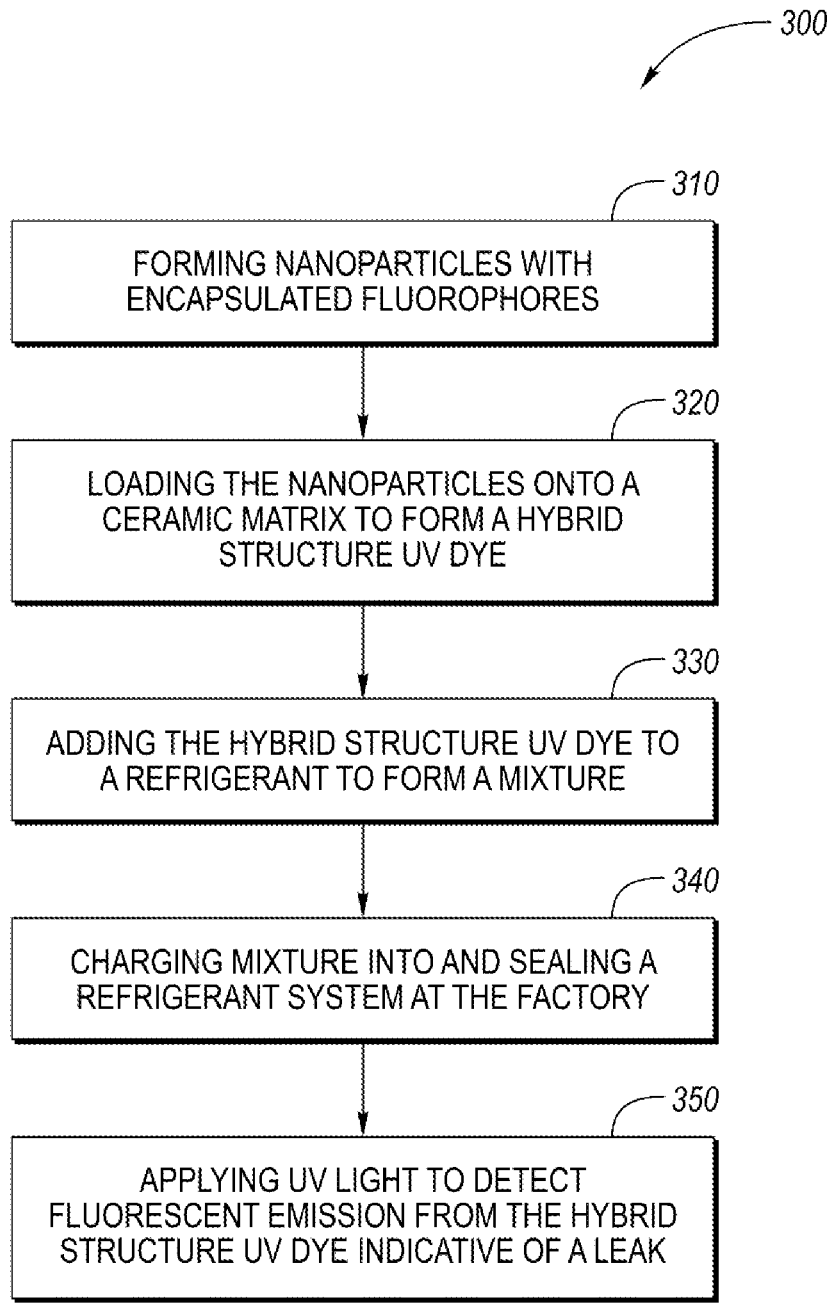
FIG. 3 is a flow diagram of a method of detecting a leak in a refrigerant system, according to an embodiment.

Referring to FIG. 3, a method 300 for detecting a refrigerant leak is provided. The method 300 includes a step 310 of forming fluorophores encapsulated in nanoparticles. The step 310 may optionally include a dye pigment within the nanoparticles. At step 320, the fluorophore nanoparticles are loaded onto a ceramic matrix to form a hybrid structure UV dye. At step 330, the hybrid structure UV dye is added to a refrigerant to form a mixture. At step 340, the mixture is charged and sealed in a sealed refrigerant system for a home appliance at the factory. At step 350, during an inspection by a technician, the technician applies a UV light (for example, via a handheld torch) to the system to inspect and locate the leak based on the hybrid structure UV dye exiting the sealed system to the external environment and emitting fluorescence at the leak location. As such, the leaked refrigerant and/or hybrid structure UV dye is observable based on the color (e.g., red) of the hybrid structure visible under the UV light, which is different from the color of fused joint adhesives. In certain embodiments, the method may include selecting the hybrid structure UV dye based on the refrigerant being flammable or non-flammable such that the color indication under the UV light corresponds to the flammability of the refrigerant.

Figure 4:
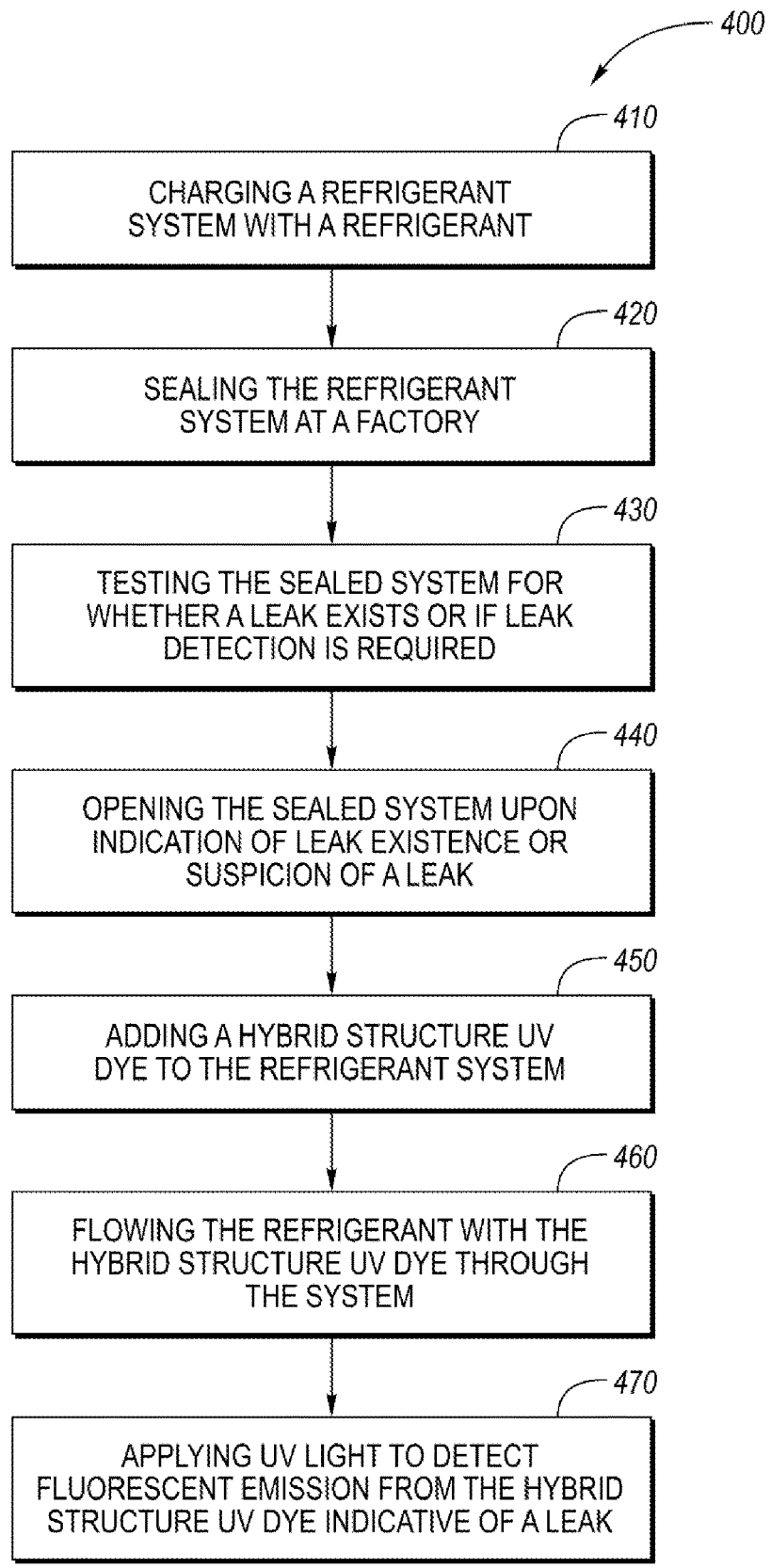
FIG. 4 is a flow diagram of a method of detecting a leak in a sealed refrigerant system, according to another embodiment.

Referring to FIG. 4, another method 400 for detecting a refrigerant leak is provided. The method 400 includes a step 410 of charging a refrigerant system of a home appliance with a refrigerant. At step 420, the refrigerant system is sealed at a factory to form a sealed refrigerant system. At step 430, a technician tests the sealed refrigerant system using conventional methods to determine whether a leak is present in the system or if leak detection is required. At step 440, upon indication a leak exists or suspicion of a leak, the technician opens the sealed system, for example, at a valve, reservoir, or joint, and at step 450, the technician adds the hybrid structure UV dye to the system. At step 460, the refrigerant with the hybrid structure UV dye is flowed through the system such that the hybrid structure UV dye can exit the sealed system components via any leaks or openings to the external surfaces and/or environment of the sealed refrigerant system. At step 470, the technician applies a UV light (for example, via a handheld torch) to locate the leak such that the hybrid structure UV dye emits fluorescence at the leak location. As such, the leaked refrigerant and/or hybrid structure UV dye is observable based on the color (e.g., red) of the hybrid structure visible under the UV light, which is different from the color of fused joint adhesives.

According to one or more embodiments, a hybrid structure UV dye includes fluorophores encapsulated in nanoparticles, which are loaded onto a ceramic matrix. The hybrid structure UV dye may also include dye within the nanoparticles to aid detection of small leaks. The hybrid structure UV dye is included in a refrigerant such that upon a leak in the sealed system, the leaked refrigerant can be detected based on the observable color of the hybrid structure UV dye upon excitation via an applied UV light. Thus, the leak can be detected quickly and have improved coloring in ambient light conditions or for selected wavelengths of UV light, and provide a different color than those conventionally used to differentiate from joint fusing adhesives. Furthermore, because the fluorophore and dye are included in nanoparticles, smaller leaks can be detected, as the hybrid structure UV dye is small enough to leak through any apertures, not just at fused joints, and does not require large leaks to occur before detection is possible.

Except where otherwise expressly indicated, all numerical quantities in this disclosure are to be understood as modified by the word "about". The term "substantially," "generally," or "about" may be used herein and may modify a value or relative characteristic disclosed or claimed. In such instances, "substantially," "generally," or "about" may signify that the value or relative characteristic it modifies is within ±0%, 0.1%, 0.5%, 1%, 2%, 3%, 4%, 5% or 10% of the value or relative characteristic (e.g., with respect to transparency as measured by opacity). Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A hybrid structure ultraviolet dye for leak detection in an appliance, comprising:
   a ceramic matrix defining pores; and
   encapsulated fluorophore nanoparticles non-covalently bonded to the ceramic matrix within the pores, wherein upon excitation, the encapsulated fluorophore nanoparticles release energy and emit fluorescent light to be detected under an ultraviolet lamp.

2. The ultraviolet dye of claim 1, wherein the encapsulated fluorophore nanoparticles exhibit red, yellow, orange, or shades therebetween.

3. The ultraviolet dye of claim 1, wherein the ceramic matrix is a silica, a colloidal silica matrix, an alumina matrix, a titania matrix, or a zirconia matrix.

4. The ultraviolet dye of claim 1, the encapsulated fluorophore nanoparticles include a mixture of fluorphores and a dye pigment.

5. The ultraviolet dye of claim 1, wherein the encapsulated fluorophore nanoparticles each individually have an average particle size of 1 to 10 nm.

6. The ultraviolet dye of claim 1, wherein the encapsulated fluorophore nanoparticles are coagulated and have an average coagulated group size of 10 to 150 nm.

7. The ultraviolet dye of claim 1, wherein the encapsulated fluorophore nanoparticles are loaded onto the ceramic matrix at 0.5% to 10% by weight.

8. A sealed system for a home appliance comprising:
   a compressor;
   at least one heat exchanger;
   tubing connecting and between the compressor and each of the at least one heat exchanger; and
   a refrigerant within the connecting tubing and flowing between the compressor and the at least one heat exchanger through the sealed system, the refrigerant including a hybrid structure ultraviolet dye having encapsulated fluorophore nanoparticles bonded to a ceramic matrix,
   wherein responsive to application of an ultraviolet light, the encapsulated fluorophore nanoparticles emit fluorescence such that leaks can be located based on presence of the hybrid structure ultraviolet dye on external surfaces of the sealed system.

9. The sealed system of claim 8, wherein the refrigerant includes 0.25% to 10% by weight of the hybrid structure ultraviolet dye.

10. The sealed system of claim 8, wherein the encapsulated fluorophore nanopartciles exhibit red, yellow, orange, or shades therebetween.

11. The sealed system of claim 8, wherein the encapsulated fluorophore nanoparticles are non-covalently bonded to the ceramic matrix.

12. The sealed system of claim 8, wherein the ceramic matrix is a silica, a colloidal silica matrix, an alumina matrix, a titania matrix, or a zirconia matrix.

13. The ultraviolet dye of claim 1, wherein the encapsulated fluorophore nanoparticles each individually have an average particle size of 1 to 10 nm.

14. The ultraviolet dye of claim 1, wherein the encapsulated fluorophore nanoparticles are coagulated and have an average coagulated group size of 10 to 150 nm.

15. The ultraviolet dye of claim 1, the encapsulated fluorophore nanoparticles include a mixture of fluorophores and a dye pigment.

16. A method of detecting a leak in a sealed system of a home appliance comprising:
   adding a hybrid structure ultraviolet dye to a refrigerant, the hybrid structure ultraviolet dye including encapsulated fluorophore nanoparticles bonded to a ceramic matrix;
   circulating the refrigerant through components of the sealed system such that the refrigerant, the hybrid structure ultraviolet dye, or both exit the sealed system at a leak onto external surfaces of the components; and
   locating the leak by applying a UV light to the external surfaces and observing a color emitted by the encapsulated fluorophore nanoparticles.

17. The method of claim 16, wherein the hybrid structure ultraviolet dye further includes a mixture of fluorphores and dye pigment in the encapsulated fluorophore nanoparticles such that the observing may be viewing a dye color exhibited on the external surfaces.

18. The method of claim 16 wherein the adding the hybrid structure ultraviolet dye to the refrigerant is conducted after opening the sealed system.

19. The method of claim 16, wherein the color is red, yellow, orange, or shades therebetween.

* * * * *